(12) United States Patent
Ryan

(10) Patent No.: US 6,918,614 B2
(45) Date of Patent: Jul. 19, 2005

(54) INFLATION ASSEMBLY FOR VARIABLE PROFILE AIR BAG

(75) Inventor: Shawn G. Ryan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 168 days.

(21) Appl. No.: 10/408,959

(22) Filed: Apr. 8, 2003

(65) Prior Publication Data

US 2004/0046376 A1 Mar. 11, 2004

Related U.S. Application Data

(60) Provisional application No. 60/408,323, filed on Sep. 5, 2002.

(51) Int. Cl.[7] .............................................. B60R 21/16
(52) U.S. Cl. ..................................... 280/743.2; 280/736
(58) Field of Search ............................. 280/743.2, 736, 280/741, 742, 731, 732

(56) References Cited

U.S. PATENT DOCUMENTS

| | | | |
|---|---|---|---|
| 5,125,682 A | 6/1992 | Hensler et al. ............. | 280/730 |
| 5,253,892 A | 10/1993 | Satoh ........................ | 280/731 |
| 5,308,113 A | 5/1994 | Moriset ..................... | 280/743 |
| 5,489,119 A | 2/1996 | Prescaro et al. .......... | 280/743.2 |
| 5,566,976 A | 10/1996 | Cuevas | |
| 5,762,367 A | 6/1998 | Wolanin .................... | 280/736 |
| 5,806,883 A | 9/1998 | Cuevas ...................... | 280/731 |
| 5,826,901 A | 10/1998 | Adomeit ................... | 280/728.2 |
| 5,887,892 A | 3/1999 | Burdack et al. ........... | 280/731 |
| 5,887,894 A | 3/1999 | Castagner et al. ........ | 280/743.2 |
| 6,039,346 A | 3/2000 | Ryan et al. ................ | 280/736 |
| 6,068,291 A | 5/2000 | Lebaudy et al. | |
| 6,076,854 A | 6/2000 | Schenck et al. .......... | 280/743.2 |
| 6,120,057 A | 9/2000 | Adomeit et al. ........... | 280/731 |
| 6,123,358 A | 9/2000 | Ryan et al. ................ | 280/739 |
| 6,168,187 B1 | 1/2001 | Yamada et al. .......... | 280/728.3 |
| 6,180,207 B1 | 1/2001 | Preisler et al. ............ | 428/139 |
| 6,206,414 B1 | 3/2001 | Cook et al. | |
| 6,227,562 B1 | 5/2001 | Shirk et al. | |
| 6,247,724 B1 | 6/2001 | Jambor et al. ............. | 280/731 |
| 6,254,121 B1 | 7/2001 | Fowler et al. ............. | 280/729 |
| 6,334,627 B1 | 1/2002 | Heym et al. ............... | 280/743.2 |
| 6,390,501 B1 | 5/2002 | Greib et al. ............... | 280/743.2 |
| 6,422,597 B1 | 7/2002 | Pinsenchaum et al. ..... | 280/735 |
| 6,425,603 B1 | 7/2002 | Eschbach ................. | 280/743.2 |
| 6,454,300 B1 | 9/2002 | Dunkle et al. ............. | 280/742 |
| 6,561,545 B2 | 5/2003 | Greib et al. | |
| 6,592,146 B2 | 7/2003 | Pinsenschaum et al. | |
| 6,616,184 B2 * | 9/2003 | Fischer .................... | 280/743.2 |

FOREIGN PATENT DOCUMENTS

| | | |
|---|---|---|
| DE | 197 56 977 | 7/1999 |
| WO | 0056580 | 9/2000 |
| WO | 0134436 | 5/2001 |

OTHER PUBLICATIONS

Copy of EP Search Report dated Nov. 21, 2003.

* cited by examiner

*Primary Examiner*—David R. Dunn
(74) *Attorney, Agent, or Firm*—Scott A. McBain

(57) ABSTRACT

An assembly of efficient construction and operation to hold restraining air bag tethers to a shortened operative length under a first set of conditions and to extend such tethers under a second set of conditions. The extension of the restraining tethers is carried out in conjunction with the delivery of an increased volume of inflating gas to the air bag cushion. The air bag assembly may be operated using as few as two activatable initiators to activate inflation stages while simultaneously controlling tether length to effect delivery of a proper volume of inflation gas for a desired cushion profile.

22 Claims, 11 Drawing Sheets

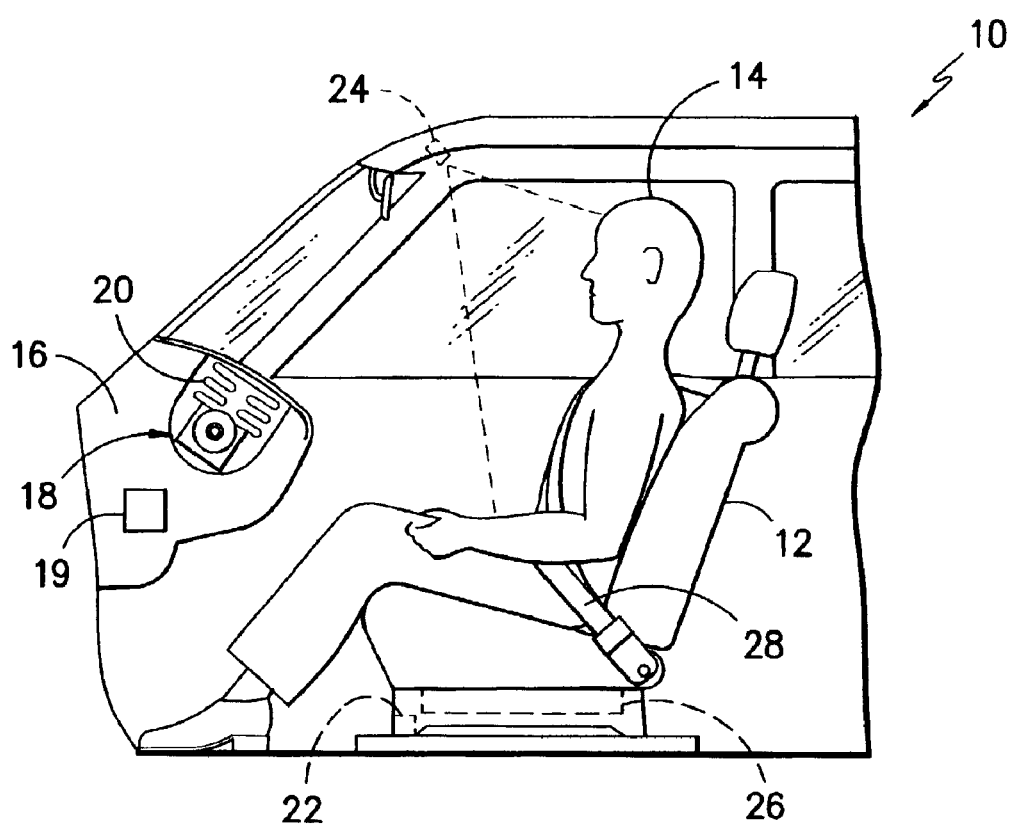
FIG. −1−

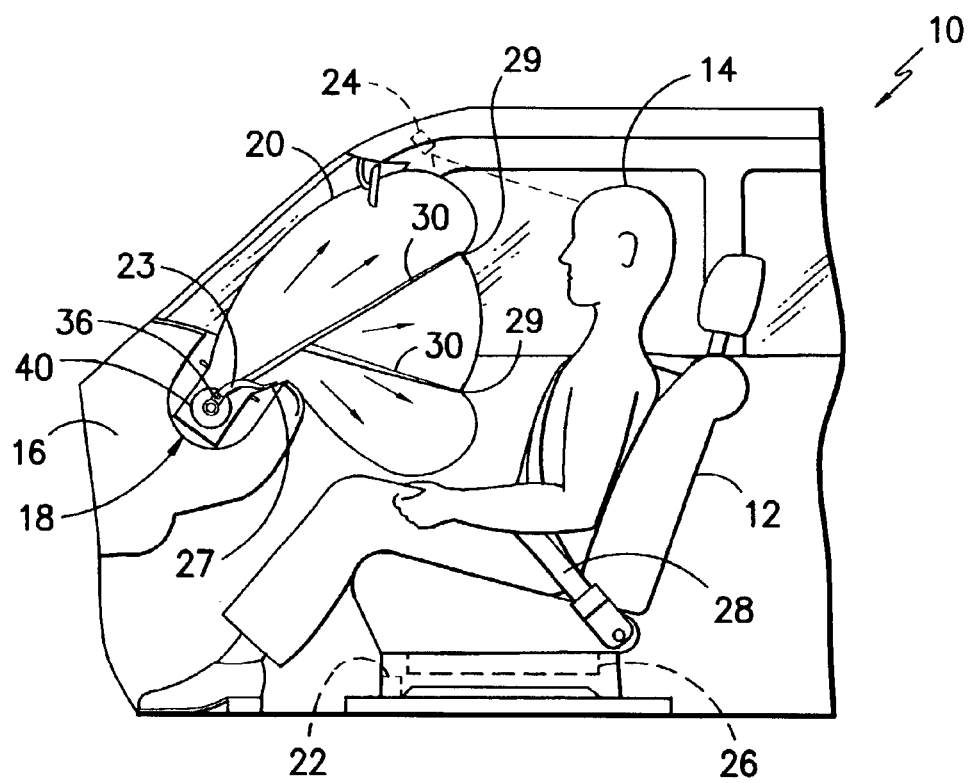
FIG. —2A—

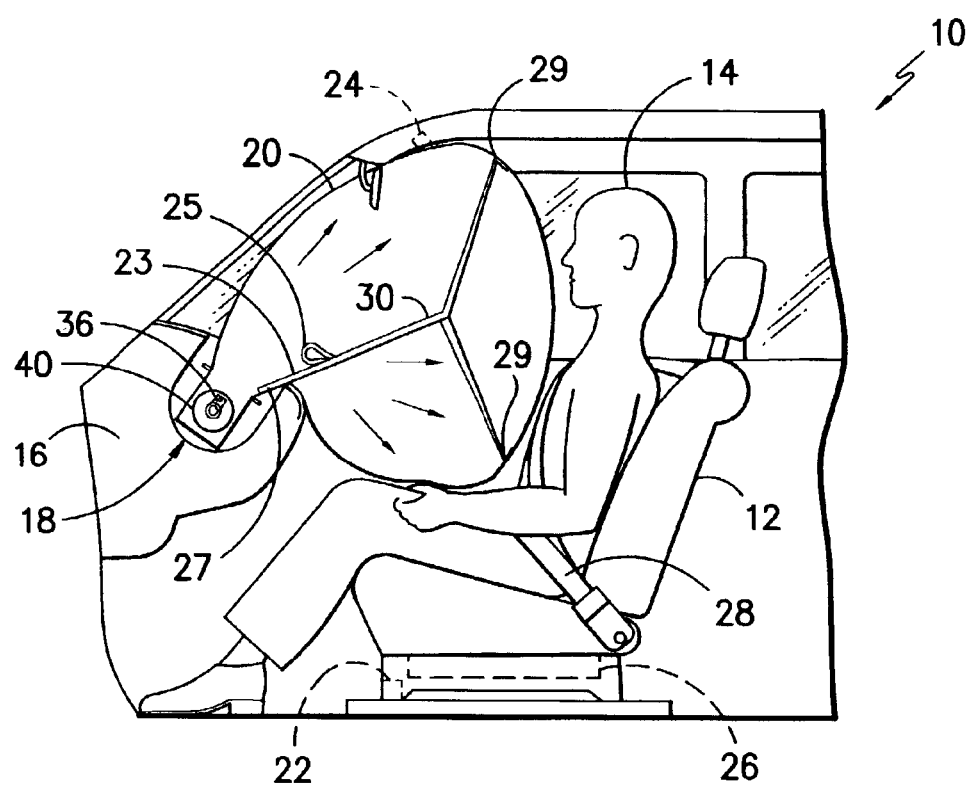
FIG. —2B—

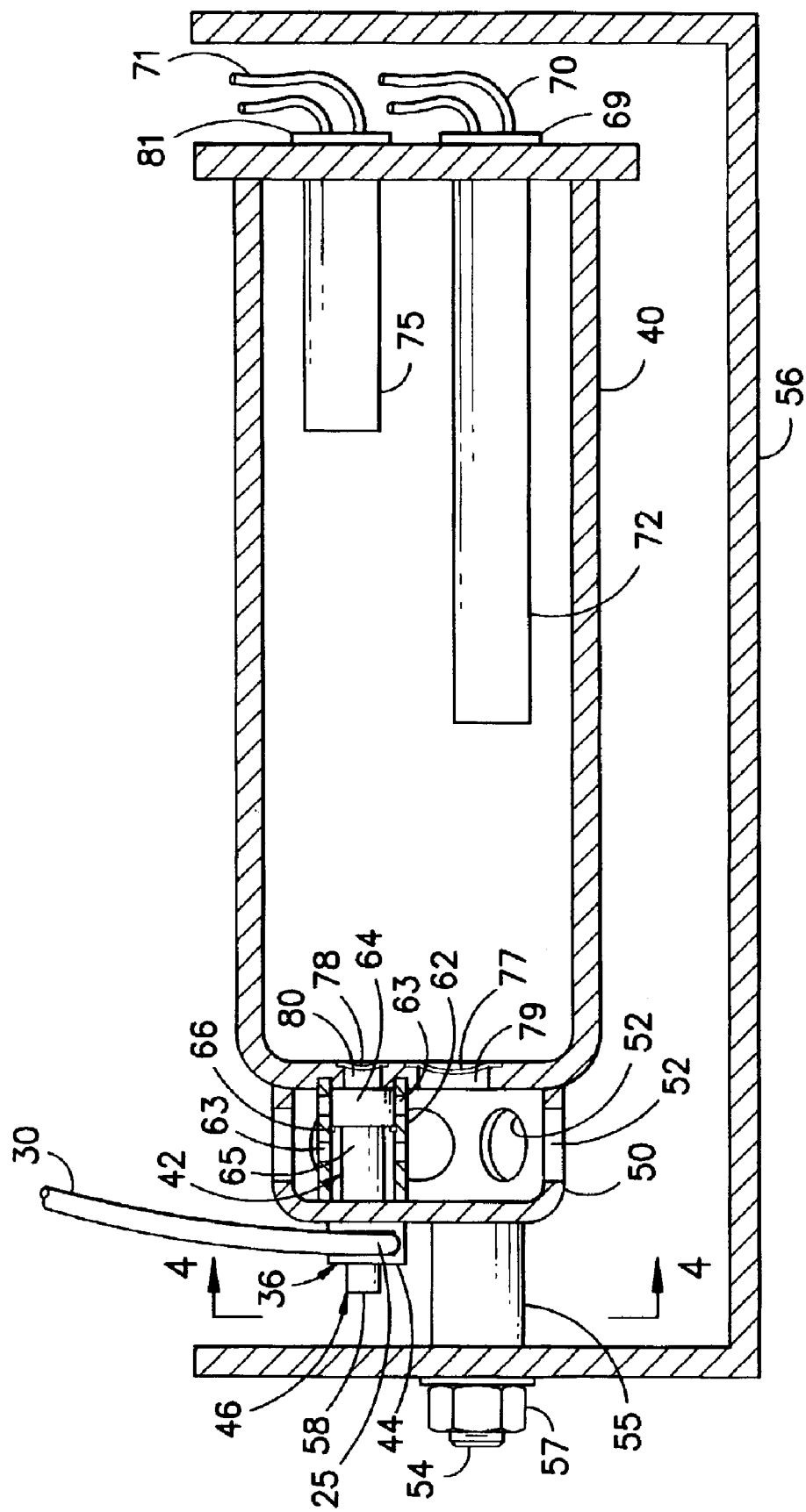
FIG. -3-

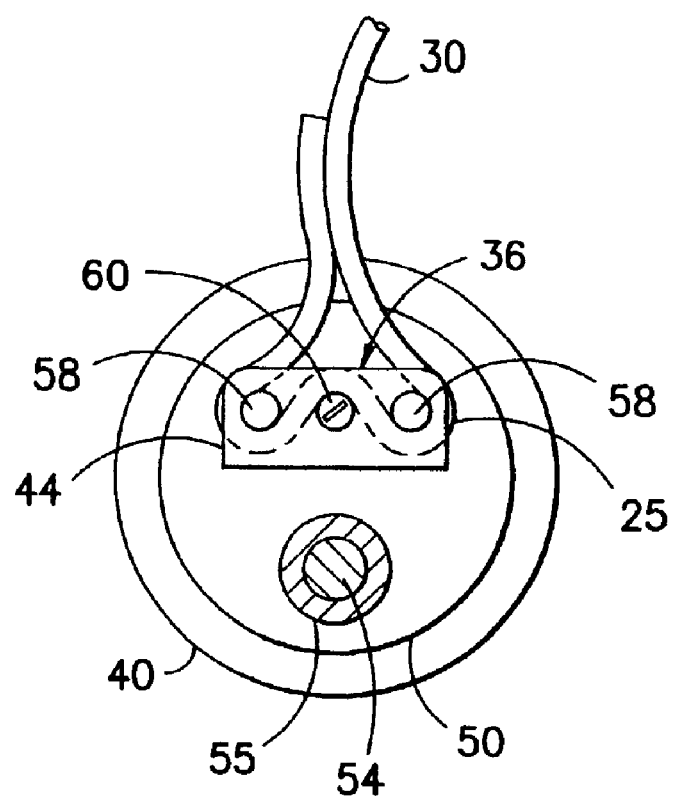
FIG. -4-

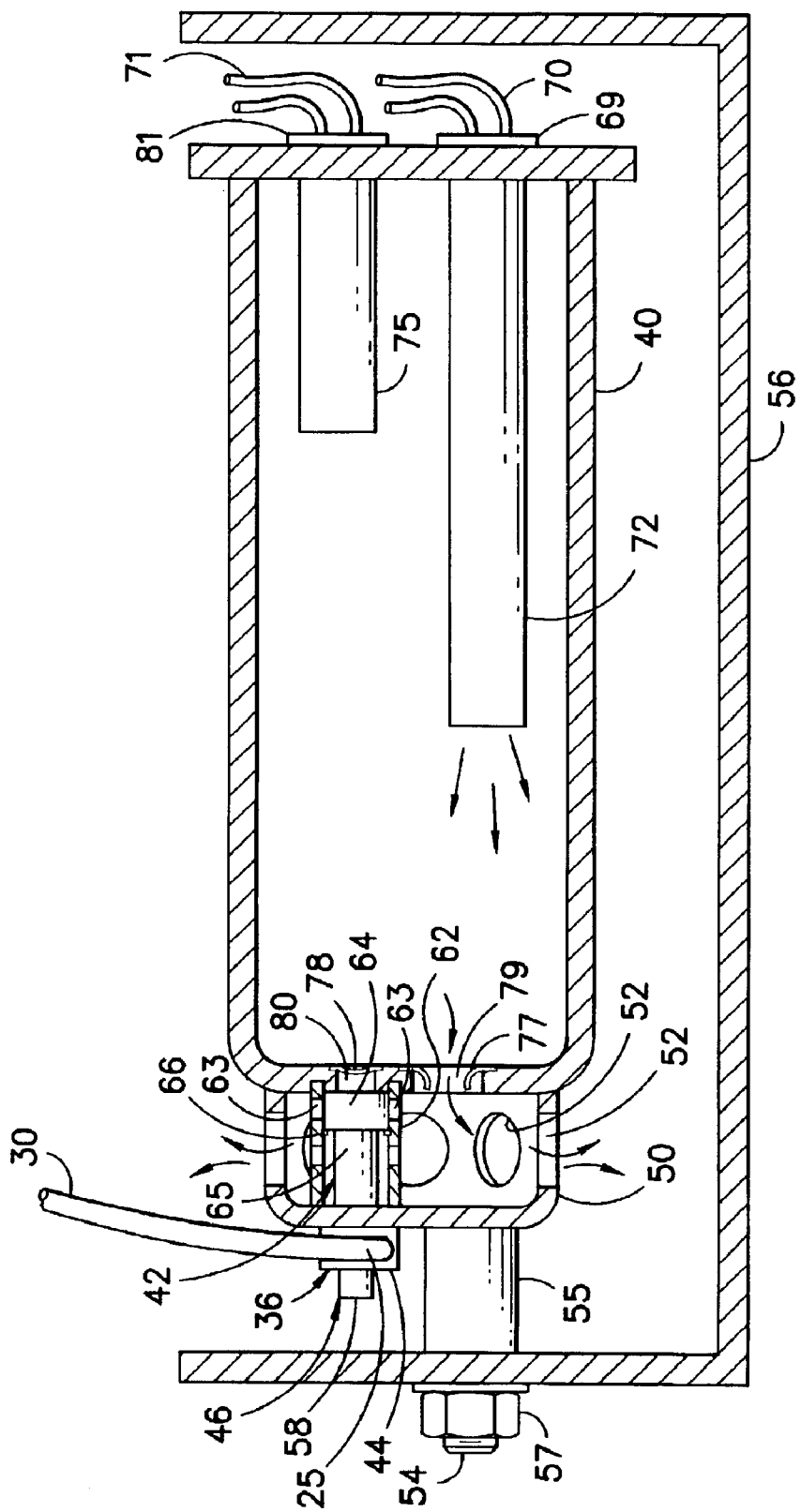
FIG. -5-

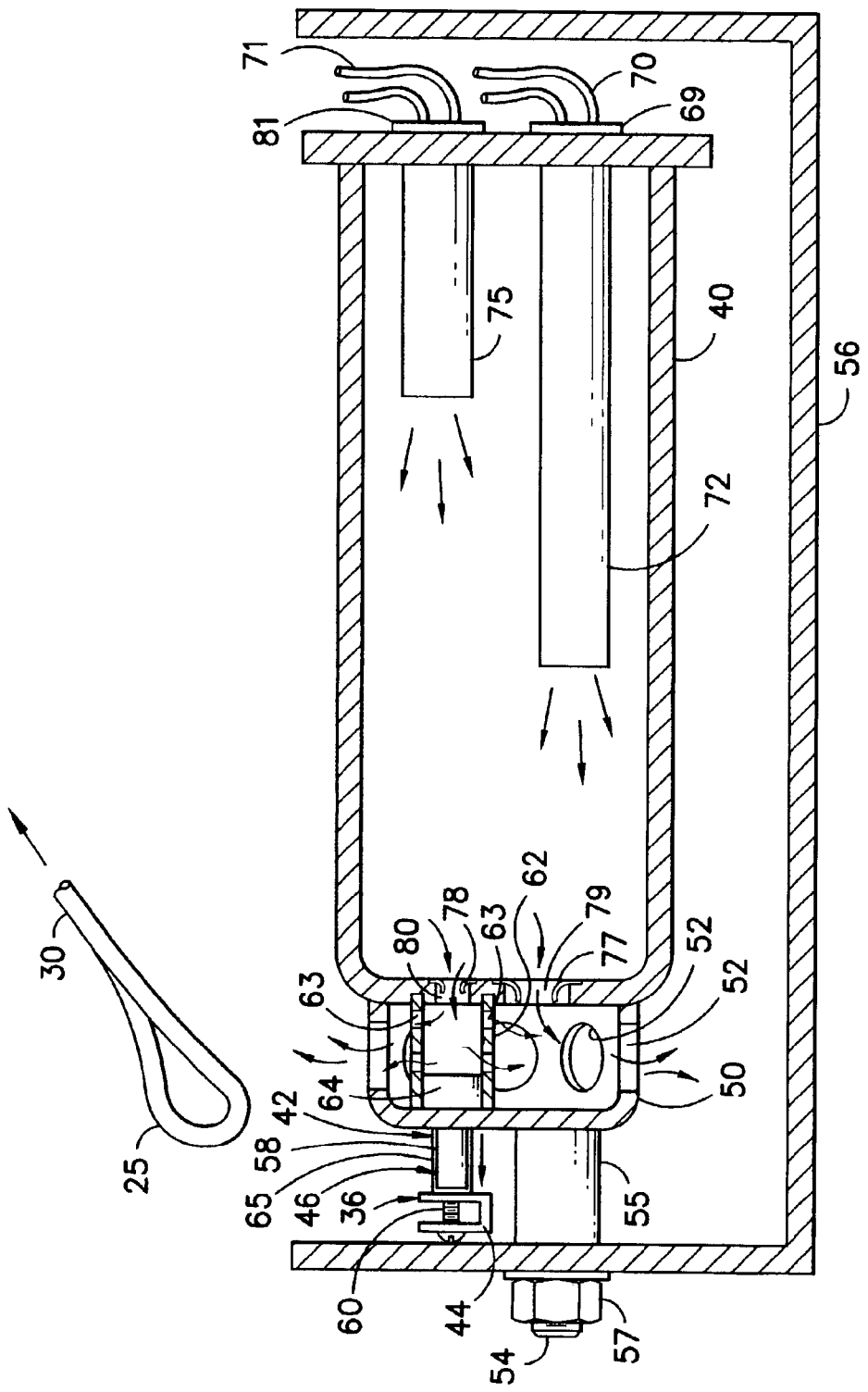
FIG. -6-

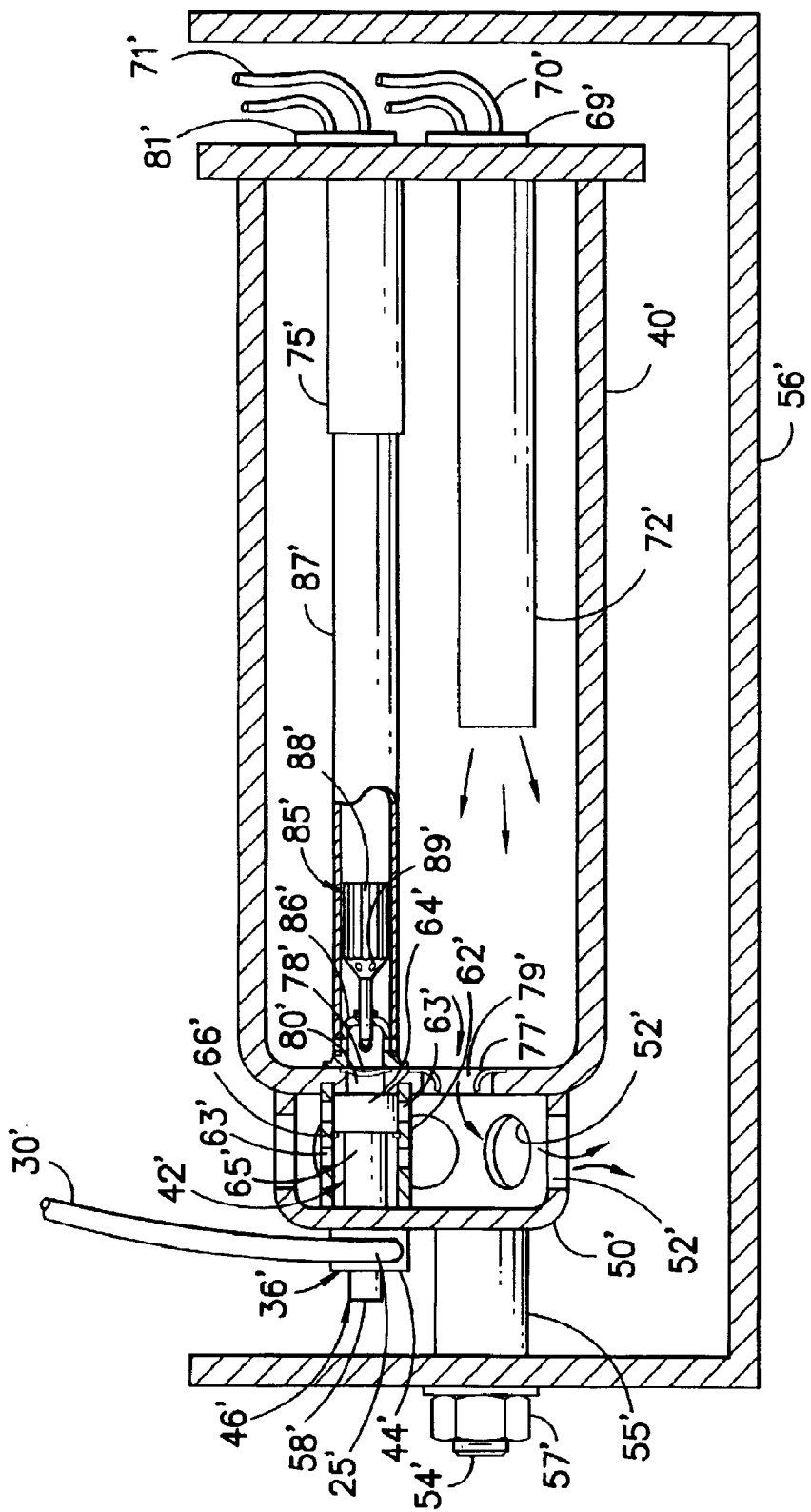
FIG. -7-

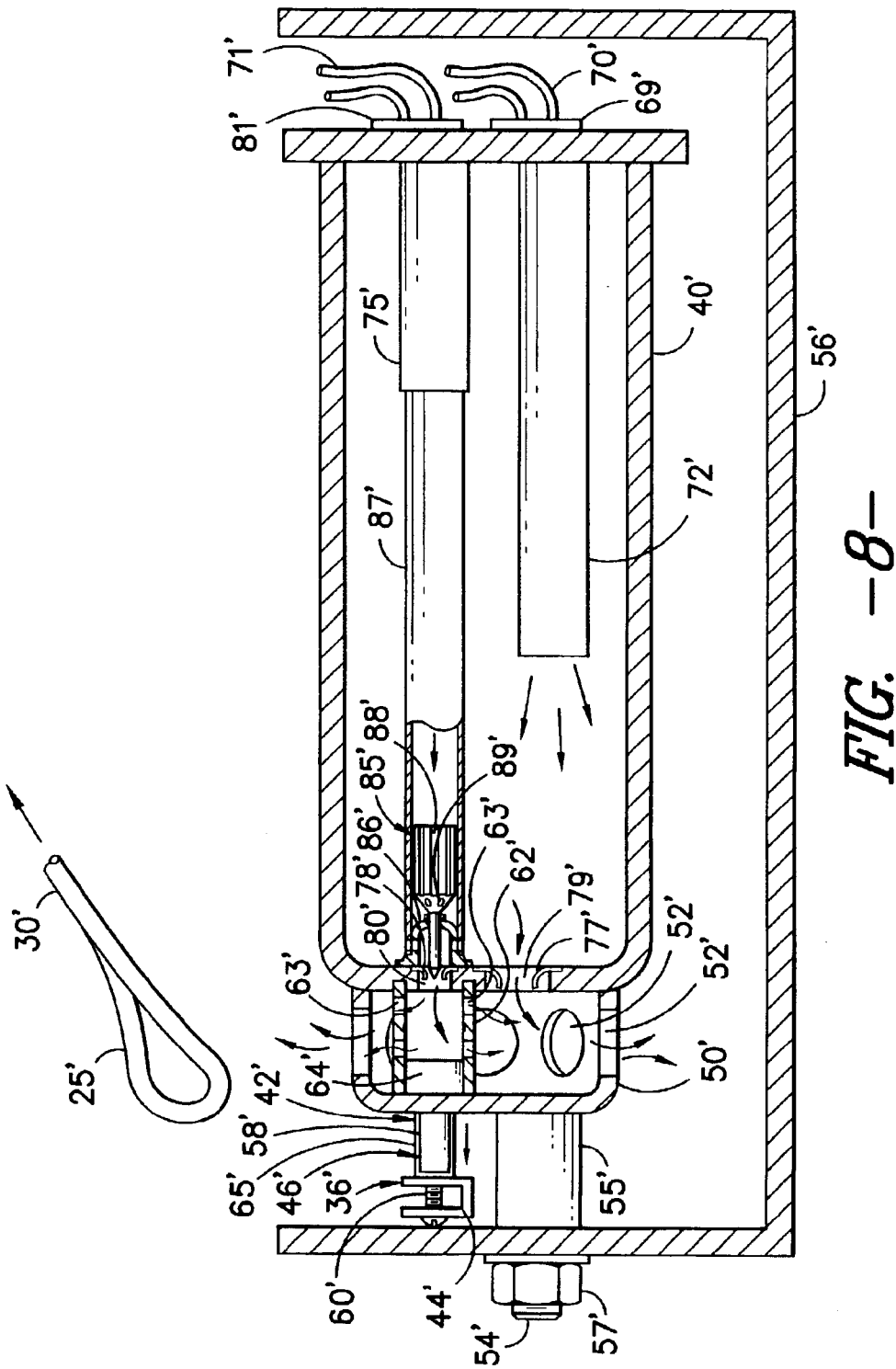
FIG. -8-

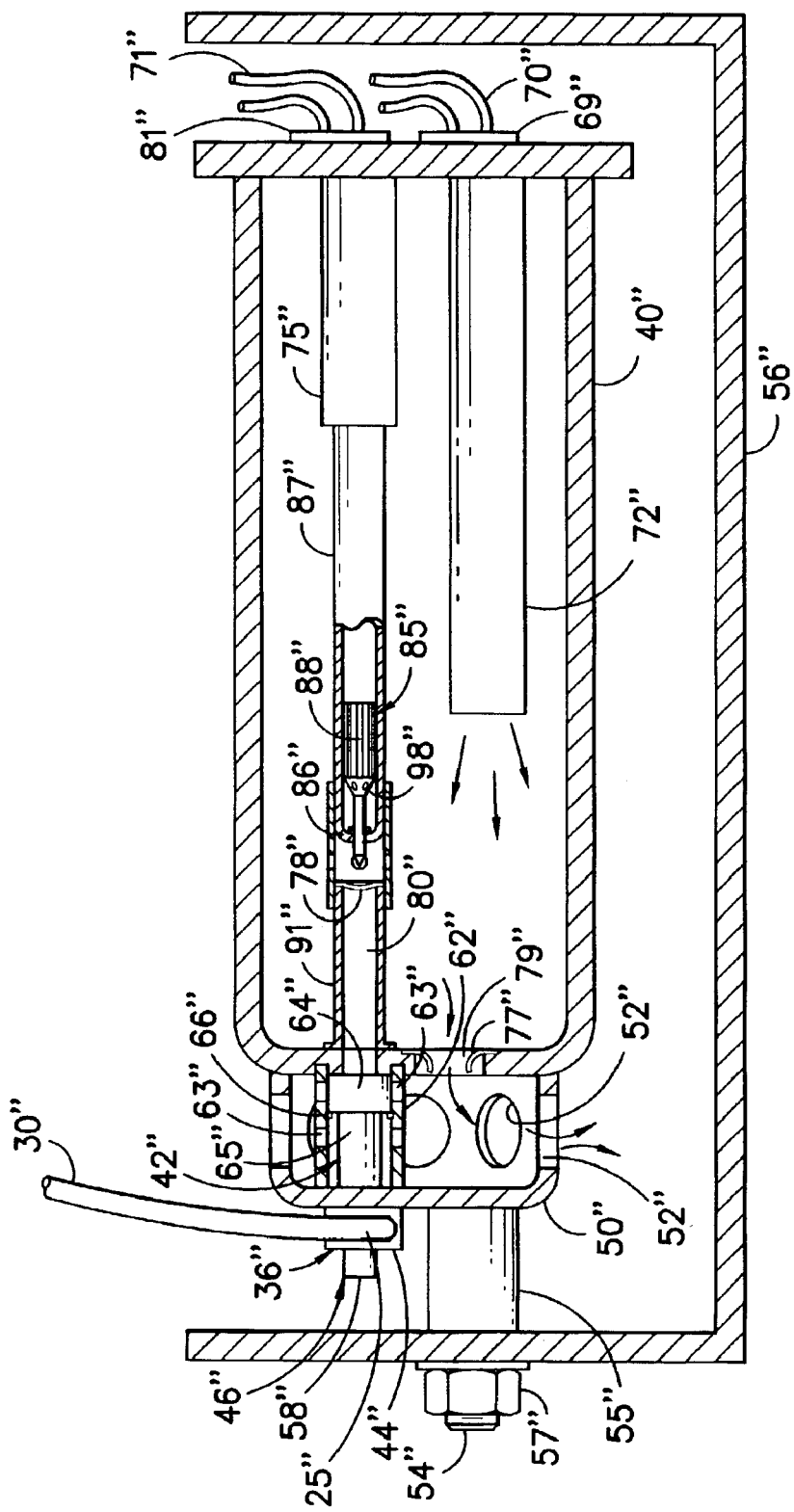
FIG. −9−

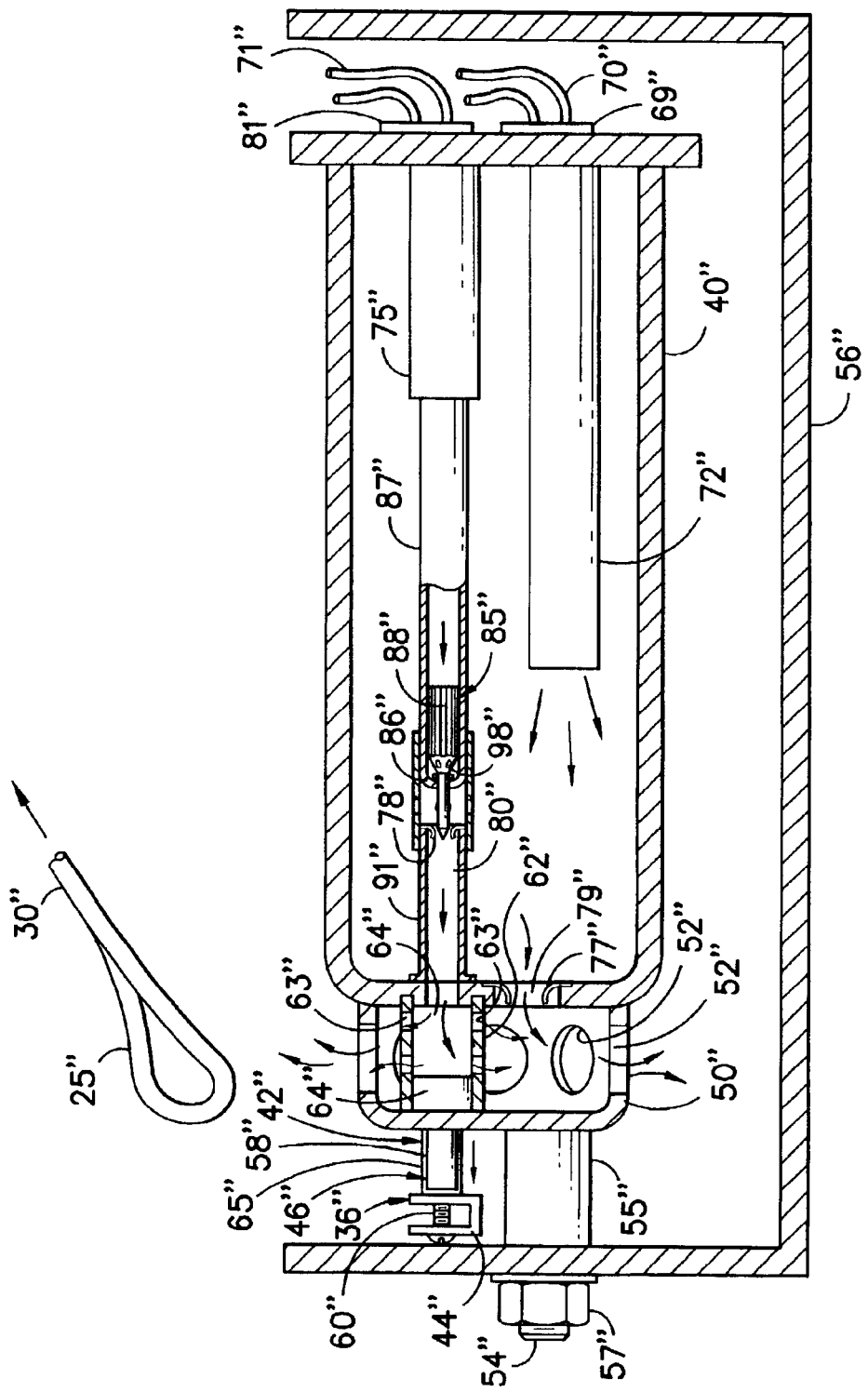
FIG. -10-

INFLATION ASSEMBLY FOR VARIABLE PROFILE AIR BAG

CROSS-REFERENCE TO RELATED APPLICATION

This application claims priority from Provisional Application No. 60/408,323 having a filing date of Sep. 5, 2002 the contents of which are incorporated herein by reference in their entirety.

TECHNICAL FIELD

This invention relates generally to an air bag assembly, and more particularly to an air bag assembly capable of variable expansion by selective retention or release of restraining tether elements operatively connected to an inflatable cushion in combination with controlled conveyance of inflation gas to the inflatable cushion.

BACKGROUND OF THE INVENTION

It is well known to provide an air bag assembly including an inflatable air bag cushion for protecting the occupants of a transportation vehicle. In an automotive vehicle such air bag assemblies are typically located within the hub of the steering wheel and in a recess in the instrument panel for protection of the vehicle occupants seated in opposing relation to such assemblies. Additional air bag assemblies may be located within the seats and/or door panels for protection of the occupants during a side-impact event.

Air bag assemblies typically include an inflatable cushion in fluid communication with a gas emitting inflator. Upon sensing certain predetermined vehicle conditions, such as a certain level of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. As the occupant comes into contact with the expanded air bag, the inflator gas is forced out of the air bag thereby dissipating the kinetic energy of the occupant.

Absent restraint, an inflated body tends to assume a generally spherical profile. In order to provide control over the inflated shape of the air bag cushion, it is known to utilize tethering elements in the form of straps or webs extending between surfaces of the air bag cushion to thereby hold the surfaces in fixed orientation relative to one another upon inflation. The selection and length of such tethering elements can thus be used to establish a desired inflated profile. However, once the tethering elements are attached in fixed relation to the surface of the air bag cushion, the inflated geometry of the cushion is likewise fixed and is not subject to adjustment.

It has been recognized that the preferred inflated profile of the air bag cushion may vary depending upon the severity of the activating impact event and/or upon the size and position of the occupant to be protected. Thus, the ability to effectively control the inflation characteristics of the air bag cushion is potentially desirable. In order to provide a degree of control over the inflated profile of the air bag cushion it is known to use an inflator that has varied levels or stages of inflator gas output in response to the sensing of different vehicle occupant conditions. Thus, it is generally known in the prior art to utilize so-called "dual-stage" inflators that discharge predetermined amounts of gas at one or two levels. However, the use of such "dual-stage" inflators provides control over only the amount of inflator gas which is discharged and does not provide control over the expanded geometry of the inflated air bag cushion. That is, due to the compressible nature of the inflation gas, so long as the air bag has a fixed volumetric capacity, the inflator gas will tend to fill that capacity and the expanded configuration of the air bag will be generally the same although the pressure may vary.

In order to provide an additional level of control over the air bag performance it has been suggested to utilize air bag cushions which incorporate sewn or woven in seams within the air bag to control the expanded geometry of the inflated air bag. Such seams separate upon the introduction of pressures exceeding a certain level thereby freeing the air bag cushion from the restraint imposed by the seams at lower pressures. In order for such break-away seams to provide controlled expansion, the introduction of such seams must be carried out with substantial precision such that seam separation will occur in a highly reproducible and predictable manner. In some instances, such requisite precision and reproducibility may be difficult to achieve. Moreover, even when such break-away seams are utilized, the expansion which occurs may be in all directions. In some applications it is believed that preferential expansion in the depth of the air bag (i.e. towards the occupant to be protected) may be desirable.

In order to address the desire to provide enhanced control over the final inflated profile of the air bag, it has been proposed to utilize release mechanisms to hold tether straps in place under normal conditions and to release the straps in situations where an extended profile is desired. By way of example only, and not limitation, various release mechanisms are illustrated and described in U.S. Pat. No. 6,390,501 to Greib et al., U.S. Pat. No. 6,422,597 to Pinsenschaum et al. and U.S. Pat. No. 6,454,300 to Dunkle et al., the contents of all of which are incorporated by reference as if fully set forth herein.

SUMMARY OF THE INVENTION

This invention provides advantages and alternatives over the prior art by providing a release mechanism of efficient construction and operation to hold restraining air bag tethers in place under a first set of predetermined conditions and to extend such tethers under a second set of predetermined conditions. The extension of the restraining tethers is carried out in conjunction with the delivery of an increased volume of inflating gas to the air bag cushion. The air bag assembly may be operated using as few as two activatable initiators to activate inflation stages within a dual stage inflator while simultaneously controlling tether length to effect delivery of a proper volume of inflation gas for a desired cushion profile.

BRIEF DESCRIPTION OF THE DRAWINGS

The present invention will now be described by way of example only, with reference to the accompanying drawings which constitute a part of the specification herein and in which:

FIG. 1 is a cut-away view of a vehicle interior showing an air bag cushion in a stored undeployed state in opposing relation to a vehicle occupant;

FIG. 2A is a view similar to FIG. 1 illustrating an air bag cushion in a deployed state restrained by an internal tether arrangement;

FIG. 2B is a view similar to FIG. 2A wherein the tether arrangement is released to a second restrained state to permit enhanced expansion of the air bag cushion towards a vehicle occupant;

FIG. 3 is a cut-away schematic side view of a dual stage inflator having two initiators and a selectively releasable tether restraint with a tether illustrated in a restrained operatively shortened condition;

FIG. 4 is an end view of the inflator illustrated in FIG. 3 taken generally along line 4—4 in FIG. 3;

FIG. 5 is a view similar to FIG. 3, with a first stage initiator in an activated condition so as to inflate an air bag cushion to a condition as illustrated in FIG. 2A;

FIG. 6 is a view similar to FIG. 3, with a first stage initiator and a second stage initiator in an activated condition so as to release a restraining tether to a lengthened operative condition and inflate an air bag cushion to a condition as illustrated in FIG. 2B;

FIG. 7 is a view similar to FIG. 5, including a puncture device in fluid communication with the second stage initiator;

FIG. 8 is a view similar to FIG. 7, with the first stage initiator and second stage initiator activated and the puncture device pushed forward to open a conveyance path for gas from the second stage initiator;

FIG. 9 is a view similar to FIG. 7, including an alternative arrangement for a puncture device in fluid communication with the second stage initiator; and FIG. 10 is a view similar to FIG. 9, with the first stage initiator and second stage initiator activated and the puncture device pushed forward to open a conveyance path for gas from the second stage initiator;

While the invention has been illustrated and will hereinafter be described in connection with certain potentially preferred embodiments, procedures and practices, it is to be understood that in no event is the invention to be limited to such illustrated and described embodiments, procedures and practices. On the contrary, it is intended that the present invention shall extend to all alternatives and modifications as may embrace the principles of this invention within the true spirit and scope thereof.

DESCRIPTION OF THE PREFERRED EMBODIMENTS

Reference will now be made to the drawings, wherein to the extent possible, like reference numerals are utilized to designate like components throughout the various views. In FIG. 1 a vehicle 10 is shown including a seating structure 12 which supports an occupant 14 in generally opposing relation to an instrument panel 16. An air bag assembly 18 including an air bag cushion 20 is housed within the instrument panel 16 for outward deployment towards the occupant 14 in the event of a collision.

While the air bag assembly 18 and corresponding air bag cushion 20 are illustrated for descriptive purposes in relation to a vehicle passenger, it is to be understood that the present invention is in no way to be limited to a passenger side configuration. On the contrary, it is contemplated that the present invention may have applicability to air bag deployment in opposing relation to the operator (not shown) of the vehicle 10 as well as in relation to air bags deployed from other regions within the vehicle interior.

It is contemplated that the vehicle 10 may include a seat position sensor 22 to detect the position of the occupant 14 relative to the air bag assembly 18. It is further contemplated that the vehicle 10 may include additional position sensors such as an optical scanner 24 or the like to measure both the volume and position of the occupant to be protected. The vehicle 10 may also be provided with a scale 26 within the seating structure 12 so as to provide additional data regarding the load to which the inflatable air bag cushion 20 may be subjected upon impact by the occupant 14. It is additionally contemplated that the seating structure 12 may be provided with sensing elements to measure the degree to which the seating structure is reclined. The vehicle 10 may also be provided with sensors to determine and communicate whether or not the occupant is utilizing the recommended seat belt structures 28. The data so collected may be combined at an on-board computer 19 which in turn, sends an activation signal to one or more initiators upon the occurrence of a collision event to release controlled volumes of inflation gas so as to effect the desirable expanded profile characteristics for the air bag cushion 20 in a given situation.

It is contemplated that the air bag cushion 20 has a first restrained expanded profile which is obtained upon extension of internal tethering elements 30 held in a shortened operative length condition and at least a second restrained expanded profile which is characterized by greater depth than the first profile. As best illustrated through simultaneous reference to FIGS. 2A and 2B, it is contemplated that one or more tethering elements 30 in the form of straps extending from locations at an interior or exterior surface of the air bag cushion 20 are utilized to control the inflated profile of the air bag cushion 20. The tethering elements 30 are normally held to a shortened operative length between connection points 29 at the interior of the cushion and a releasable restraint assembly 36 in the vicinity of a gas generating inflator 40. In this regard it is to be understood that the connection points 29 may be either fixed connection points or sliding connection points such as supporting sleeves or the like through which the tethering elements 30 are threaded. The releasable attachment at the restraint assembly 36 may be effected by use of an integral or supplemental sliding loop structure 25 such as a short length of cord or the like although it is contemplated that any number of other arrangements may likewise be utilized.

As shown in FIG. 2A under normal operating conditions, the tethering elements 30 restrain the profile of the expanding air bag cushion 20 to a first diminished depth. By way of example only, and not limitation, it is contemplated that such a restrained profile may be of particular use in the protection of smaller stature occupants and/or occupants seated in close proximity to the instrument panel 16. As shown in FIG. 2B, in instances where a deeper profile is desired, the tethering elements 30 may be released from the restraint assembly 36 thereby yielding a permissible expanded geometry of expanded depth.

It is contemplated that some degree of restraint may nonetheless be maintained by a length extending tether extension 23 such as a strap or the like operatively connected between the tethering elements and a secondary attachment location 27 which may be either on the surface of the air bag cushion or at an external location. The tethering elements 30 may be arranged within the air bag cushion 20 such that they are affixed at opposing ends to the surface of the cushion and are brought to a shortened operative condition by pulling an intermediate portion of the tethering elements through surface loops and towards the restraint assembly 36. Regardless of the tethering arrangement, it is contemplated that an expanded depth may be useful in the protection of larger stature occupants and/or in the protection of occupants seated a substantial distance away from the instrument panel 16.

As will be appreciated, upon the release of the tethering elements 30 from the restraint assembly 36, the volume of the air bag is increased. According to a potentially preferred practice, the air bag assembly 18 incorporates a selectively activatable variable inflation device which causes a controlled volume of inflation gas to be delivered to the air bag cushion depending upon the desired inflation characteristics. That is, the variable inflation device will deliver a greater volume of inflation gas to the air bag cushion 20 in instances where a deep profile such as is illustrated in FIG. 2B is desired. Conversely, in instances where a more shallow inflated profile is desired such as illustrated in FIG. 2A, a smaller volume of inflation gas is released into the air bag cushion 20.

According to a first exemplary practice, the variable inflation device incorporates a displaceable plug element 42 which is operatively connected to a tether displacement or carrier element 44 which makes up part of the releasable restraint assembly. In a potentially preferred arrangement, the plug element 42 is adapted to undergo a sliding displacement in conjunction with the delivery of an enhanced volume of inflation gas from the inflator 40. The sliding displacement of the plug element 42 is, in turn, translated to the tether displacement element 44 so as to carry the tethering elements 30 away from an anchoring structure 46 thereby permitting the tethering elements 30 to be pulled away from an initial anchored position and assume an extended operative length. The sliding displacement of the plug element also opens up a normally closed auxiliary gas transfer path to convey an enhanced volume of inflation gas into the air bag cushion.

In the exemplary embodiment illustrated schematically in FIG. 3, the inflator 40 includes a primary diffuser 50 including an arrangement of gas transmission openings 52 arranged so as to convey released inflation gas into an air bag cushion. In the illustrated arrangement, a stud 54 projecting away from a spacer 55 may be disposed at the surface of the primary diffuser 50 for supporting attachment through a wall of an inflator housing 56 such as by a nut 57 or other appropriate fastening device. Of course, virtually any other support arrangement as may be desired may likewise be utilized if desired.

As best illustrated through simultaneous reference to FIGS. 3 and 4, the anchoring structure 46 may be made up of one or more support pins 58 which extend away from the outer face of the primary diffuser and in sliding relation through aligned openings in the tether displacement element 44. In the illustrated construction, the support pins 58 support the tethering elements 30 within the gap between walls of the slotted carrier element 44. Thus, in the position illustrated in FIG. 3, the tethering element 30 is restrained on either side by the walls of the carrier element 44 and thus cannot move away from the support pins 58. In the illustrated configuration, a screw 60 or other attachment device extends through the carrier element 44 and into the plug element 42 so as to establish an operative connection between the carrier element 44 and the plug element 42. Of course, other means for effecting operative connection between the tether carrier element 44 and the plug element 42 such as welding, fusion bonding and adhesive connection may also be used if desired.

As illustrated, the plug element 42 is housed within a secondary diffuser 62 including an arrangement of gas transmission openings 63. As illustrated, in this arrangement the outer diameter of the plug element 42 is such that it slides within the secondary diffuser upon the application of a sufficient force in the direction of the carrier element 44. While the actual configuration of the plug element 42 is not critical, it is contemplated that the plug element 42 may include a relatively large diameter gas impingement portion 64 having an outer diameter which substantially fills the inner diameter of the secondary diffuser 62. The gas impingement portion 64 of the plug element 42 thus defines a reaction surface for contacting a pressurized stream of inflation gas to cause movement of the plug element along the secondary diffuser 62 in a manner to be described further hereinafter. The plug element 42 may also have a reduced diameter portion 65 projecting in the direction of movement of the plug element.

If desired, it is contemplated that shear elements 66 may be disposed between the plug element 42 and the secondary diffuser 63 to prevent undesired movement of the plug element 42 prior to the introduction of an activating driving force. Of course, such shear elements may be of any arrangement as may be desired. It is likewise contemplated that shear elements may be disposed at the carrier element 44 rather than within the secondary diffuser 62.

The operation of the device may be readily understood by reference to FIGS. 5 and 6. Referring first to FIG. 5, in the event that a reduced profile cushion deployment such as is illustrated in FIG. 2A is desired, an activating signal is sent by the on board computer 19 to a first initiator 69 such as a pyrotechnic squib or the like through leads 70. The initiator 69 activates a primary gas generator 72 thereby causing a volume of inflation gas to be emitted from the primary gas generator 72. Of course, it is to be understood that the primary gas generator 72 may be of any suitable type as will be known to those of skill in the art. By way of example only, suitable gas generators may include chemical reactive inflators, stored gas inflators and hybrid inflators utilizing combinations of both chemical reaction and stored gas.

Upon emission of inflation gas from the primary gas generator 72, a pressure will be developed within the body of the inflator 40 thereby causing the opening of a normally sealed first gas path opening 79 which is isolated from the impingement portion 64 of the plug element 42. Inflation gas thus passes through the first gas path opening 79 into the primary diffuser 50 and through the gas transmission openings 52 to an air bag cushion. Under the conditions illustrated in FIG. 5, a second initiator 81 remains inactive and the plug element 42 and carrier element 44 remain unmoved such that the tether element 30 remains secured at the support pins 58.

In the arrangement illustrated in FIG. 5 the selective expulsion of inflation gas into the primary diffuser 50 without movement of the plug element 42 is effected by the use of a first burst disk 77 disposed in covering relation to the first gas path opening 79. A second burst disk 78 is disposed in covering relation to a second gas path opening 80 which is in fluid communication with the gas impingement portion 64 of the plug element 42. As shown in FIG. 5, the first burst disk 77 is adapted to open upon exposure to pressure at a level developed within the inflator by activation of the primary gas generator. However, at this pressure the second burst disk remains intact thereby maintaining the isolation of the secondary discharge flow channel and thus avoiding pressurized displacement of the plug element 42.

As shown in FIG. 6, when an extended depth cushion profile such as illustrated in FIG. 2B is desired, activating signals are communicated through leads 70, 71 to the first initiator 69 and to the second initiator 81 such as a pyrotechnic squib or the like. Under these conditions, the primary gas generator 72 and the secondary gas generator 75 are both activated so as to generate an enhanced volume of inflation gas. Due to this enhanced volume of inflation gas, an adequate pressure is developed to fracture the first burst disk 77 as well as the second burst disk 78. If desired, it is contemplated that the enhanced volume of inflation gas may be produced simply providing additional heat to the volume of gas expelled by a single gas generator. In such an arrangement the second gas generator may be eliminated if desired As inflation gas passes under pressure through the second gas path opening 80, the inflation gas contacts the gas impingement portion 64 of the plug element 42 with sufficient force to overcome the shear elements 66 and thereby push the plug element 42 along the length of the secondary diffuser 62. As the plug element 42 is displaced, gas transmission openings 63 are opened thereby directing the driving gas outwardly and into the air bag cushion. As shown, the displacement of the plug element 42 is translated to the operatively connected carrier element 44 thereby causing the carrier element 44 to push the loop structure 25 off of the support pins 58. Once the loop structure is clear of the support pins 58, the tether element 30 may be pulled away from the releasable restraint assembly 36 by tension introduced by the inflating air bag cushion. As will be appreciated, this device can thus simultaneously adjust gas flow and tether length. Moreover, such adjustment may be carried out using only two initiators 69, 81.

Of course, it is to be understood that the present invention may be the subject of a wide range of alternatives. By way of example only, and not limitation, one alternative construction is illustrated in FIGS. 7 and 8 wherein elements corresponding to those previously described are designated by like reference numerals with a prime. As will be appreciated, the variable inflation device illustrated in FIGS. 7 and 8 operates in a substantially identical manner to the arrangement illustrated in FIGS. 5 and 6 with the exception that the second burst disk 78' is opened by a puncture element 85' which is pushed into contact with the second burst disk 78' upon activation of the secondary gas generator 75'.

As illustrated, the puncture element 85' is normally held out of contact with the second burst disk 78' such as by a support member 86' spaced away from the second burst disk 78'. However, the puncture element is nonetheless disposed in fluid communication with the secondary gas generator 75' such as by a gas conduit 87'. Upon activation of the secondary gas generator 75', the puncture element 85' is driven forward so as to puncture the second burst disk and open up the second gas path opening 80' (FIG. 8). Of course, various arrangements may be utilized to pass inflation gas from the secondary gas generator around and/or through the puncture element 85' after the puncture has taken place. By way of example only, it is contemplated that the puncture element 85' may include an arrangement of grooves 88' around its outer surface thereby allowing gas to pass around the puncture element. It is also contemplated that the puncture element 85' may include an arrangement of internal gas openings 89' through the interior. As will be appreciated, such external grooves and/or internal openings may be sized so as to allow passage of gas following puncture while nonetheless providing sufficient resistance to initiate displacement of the puncture element 85'. The support member 86' also preferably includes an arrangement of gas passages.

Still another configuration is illustrated in FIGS. 9 and 10 in which elements corresponding to those previously described are designated by like reference numerals with a double prime. As will be appreciated, the configuration in FIGS. 9 and 10 is substantially the same as the construction illustrated in FIGS. 7 and 8 with the exception that second gas path opening 80" and covering burst disk 78" are extended towards the secondary gas generator 75" by an extension conduit 91". Such a construction may simplify construction and provide improved activation speed due to the shortened distance between the secondary gas generator 75" and the puncture element 85".

It is to be understood that while the present invention has been illustrated and described in relation to potentially preferred embodiments, constructions and procedures, that such embodiments, constructions and procedures are illustrative only and the present invention is in no event to be limited thereto. Rather it is contemplated that modifications and variations embodying the principles of the present invention will no doubt occur to those skilled in the art. It is therefore contemplated and intended that the present invention shall extend to all such modifications and variations as may incorporate the broad aspects of the present invention within the full spirit and scope thereof.

What is claimed is:

1. An air bag assembly for cushioning restraint of an occupant in a vehicle during an impact event, the air bag assembly comprising:

a gas emitting inflator, the inflator including a first selectively activatable initiator adapted to activate the release of a first volume of inflation gas and at least a second selectively activatable initiator, the first initiator being activatable either independently from the second initiator or in conjunction with activation of the second initiator such that upon activation of both the first initiator and the second initiator a second volume of inflation gas is released which is greater than the first volume of inflation gas;

an inflatable air bag cushion in fluid communication with the inflator such that upon discharge of inflation gas from the inflator the air bag cushion is inflated to a deployed state;

at least one profile restraining tethering element operatively connected to the air bag cushion, a restraint assembly operatively coupled to the profile restraining tethering element remote from the air bag cushion such that the profile restraining tethering element is held in a shortened operative condition, said restraint assembly remaining coupled to the profile restraining tethering element in response to activation of the first initiator, and adapted to release the profile restraining tethering element in response to activation of both the first initiator and the second initiator.

2. The invention according to claim 1, wherein the first initiator is a pyrotechnic squib.

3. The invention according to claim 1, wherein both the first initiator and the second initiator are pyrotechnic squibs.

4. The invention according to claim 1, wherein the inflator includes a primary gas transfer path adapted to transfer inflation gas into the air bag cushion upon release of the first volume of inflation and a secondary gas transfer path adapted to transfer inflation gas the restraint assembly upon release of the second volume of inflation gas and wherein the secondary gas transfer path is isolated from inflation gas transmission prior to activation of the second initiator.

5. The invention according to claim 4, wherein the secondary gas transfer path is bounded by a diffuser with a displaceable plug element disposed within the diffuser, the displaceable plug element being adapted to move in response to gas pressure such that upon introduction of inflation gas into the secondary gas transfer path the displaceable plug element is moved at least partially along the diffuser.

6. The invention according to claim 5, wherein the displaceable plug element is adapted to at least partially block fluid transfer across the diffuser and into the air bag cushion prior to movement of the displaceable plug element.

7. The invention according to claim 6, wherein at least the secondary gas transfer path is normally sealed from inflation gas by a sealing element which is selectively opened upon activation of the second initiator.

8. The invention according to claim 7, wherein the sealing element comprises a rupture disk.

9. The invention according to claim 8, wherein the rupture disk sealing the secondary gas transfer path is adapted to spontaneously rupture upon application of a gas pressure generated by activation of the first initiator in conjunction with activation of the second initiator.

10. The invention according to claim 8, wherein the air bag assembly includes a displaceable puncture element adapted to puncture the rupture disk upon activation of the second initiator such that the rupture disk is opened and inflation gas is conveyed into the secondary gas transfer path.

11. An air bag assembly for cushioning restraint of an occupant in a vehicle during an impact event, the air bag assembly comprising:

a gas emitting inflator, the inflator including a first selectively activatable initiator adapted to activate the release of a first volume of inflation gas and at least a second selectively activatable initiator, the first initiator being activatable either independently from the second initiator or in conjunction with activation of the second initiator such that upon activation of both the first initiator and the second initiator a second volume of inflation gas is released which is greater than the first volume of inflation gas;

an inflatable air bag cushion in fluid communication with the inflator such that upon discharge of inflation gas from the inflator the air bag cushion is inflated to a deployed state;

at least one profile restraining tethering element operatively connected to the air bag cushion, and a restraint assembly operatively connected in releasable relation to the tethering element remote from the air bag cushion such that the profile restraining tethering element is normally held in a shortened operative condition, the restraint assembly including at least one support member normally disposed in operative supporting relation to the profile restraining tethering element and a displaceable carrier element adapted to carry the profile restraining tethering element away from supported relation at the support member upon activation of both the first initiator and the second initiator, such that the profile restraining tethering element is released from operative connection to the restraint assembly in response to emission of said second volume of inflation gas.

12. The invention according to claim 11, wherein the first initiator is a pyrotechnic squib.

13. The invention according to claim 11, wherein both the first initiator and the second initiator are pyrotechnic squibs.

14. The invention according to claim 11, wherein the inflator includes a primary gas transfer path adapted to transfer inflation gas into the air bag cushion upon release of the first volume of inflation and a secondary gas transfer path adapted to transfer inflation gas into the air bag cushion upon release of the second volume of inflation gas and wherein the secondary gas transfer path is isolated from inflation gas transmission prior to activation of the second initiator.

15. The invention according to claim 14, wherein the secondary gas transfer path is bounded by a diffuser with a displaceable plug element disposed within the diffuser, the displaceable plug element being operatively connected to the displaceable carrier element, the displaceable plug element being adapted to move in response to gas pressure such that upon introduction of inflation gas into the secondary gas transfer path the displaceable plug element is moved at least partially along the diffuser and the displaceable carrier element undergoes displacement so as to carry the profile restraining tethering element away from supported relation at the support member.

16. The invention according to claim 15, wherein the displaceable plug element is adapted to at least partially block fluid transfer through across the diffuser and into the air bag cushion prior to movement of the displaceable plug element.

17. The invention according to claim 16, wherein at least the secondary gas transfer path is normally sealed from inflation gas by a sealing element which is selectively opened upon activation of the second gas generator.

18. The invention according to claim 17, wherein the sealing element comprises a rupture disk.

19. The invention according to claim 18, wherein the rupture disk sealing the secondary gas transfer path is adapted to spontaneously rupture upon application of a gas pressure generated by activation of the first initiator in conjunction with activation of the second initiator.

20. The invention according to claim 18, wherein the air bag assembly includes a displaceable puncture element adapted to puncture the rupture disk upon activation of the second initiator such that the rupture disk is opened and inflation gas is conveyed into the secondary gas transfer path.

21. An air bag assembly for cushioning restraint of an occupant in a vehicle during an impact event, the air bag assembly comprising:

a gas emitting inflator, the inflator including a first selectively activatable pyrotechic initiator adapted to activate release of a first volume of inflation gas and at least a second selectively activatable pyrotechnic initiator, the first initiator being activatable either independently from the second initiator or in conjunction with the second initiator such that upon activation of both the first initiator and the second initiator a second volume of inflation gas is released which is greater than the first volume of inflation gas;

an inflatable air bag cushion in fluid communication with the inflator such that upon discharge of inflation gas from the inflator the air bag cushion is inflated to a deployed state;

at least one profile restraining tethering element operatively connected to the air bag cushion, the tethering element further normally being operatively connected in releasable relation to a restraint assembly remote from the air bag cushion such that the profile restraining tethering element is normally held in a shortened operative condition, the restraint assembly including at least one support member normally disposed in operative supporting relation to the profile restraining tethering element and a displaceable carrier element adapted to carry the profile restraining tethering element out of operative supported relation at the support member upon activation of both the first initiator and the second initiator and wherein displacement of the carrier element is initiated by activation of the first initiator in conjunction with activation of the second initiator without any additional activatable initiator, wherein the inflator includes a primary gas transfer path adapted to transfer inflation gas into the air bag cushion upon release of the first volume of inflation and a secondary gas transfer path adapted to transfer inflation gas into the air bag cushion upon release of the second volume of inflation gas, the secondary gas transfer path being bounded by a diffuser with a displaceable plug element disposed within the diffuser, the displaceable plug element being operatively connected to the displaceable carrier element, the displaceable plug element being adapted to move in response to gas pressure such that upon introduction of inflation gas into the secondary gas transfer path the displaceable plug element is moved at least partially along the diffuser and the displaceable carrier element undergoes displacement so as to carry the profile restraining tethering element away from supported relation at the support member, and wherein the displaceable plug element is adapted to at least partially block fluid transfer through across the diffuser and into the air bags cushion prior to movement of the displaceable plug element.

22. The invention according to claim 21, wherein at least the secondary gas transfer path is normally sealed from inflation gas by a sealing element which is selectively opened upon activation of the second gas generator.

* * * * *